(No Model.)
W. B. COULTER.
RELIEF VALVE.
No. 311,723. Patented Feb. 3, 1885.
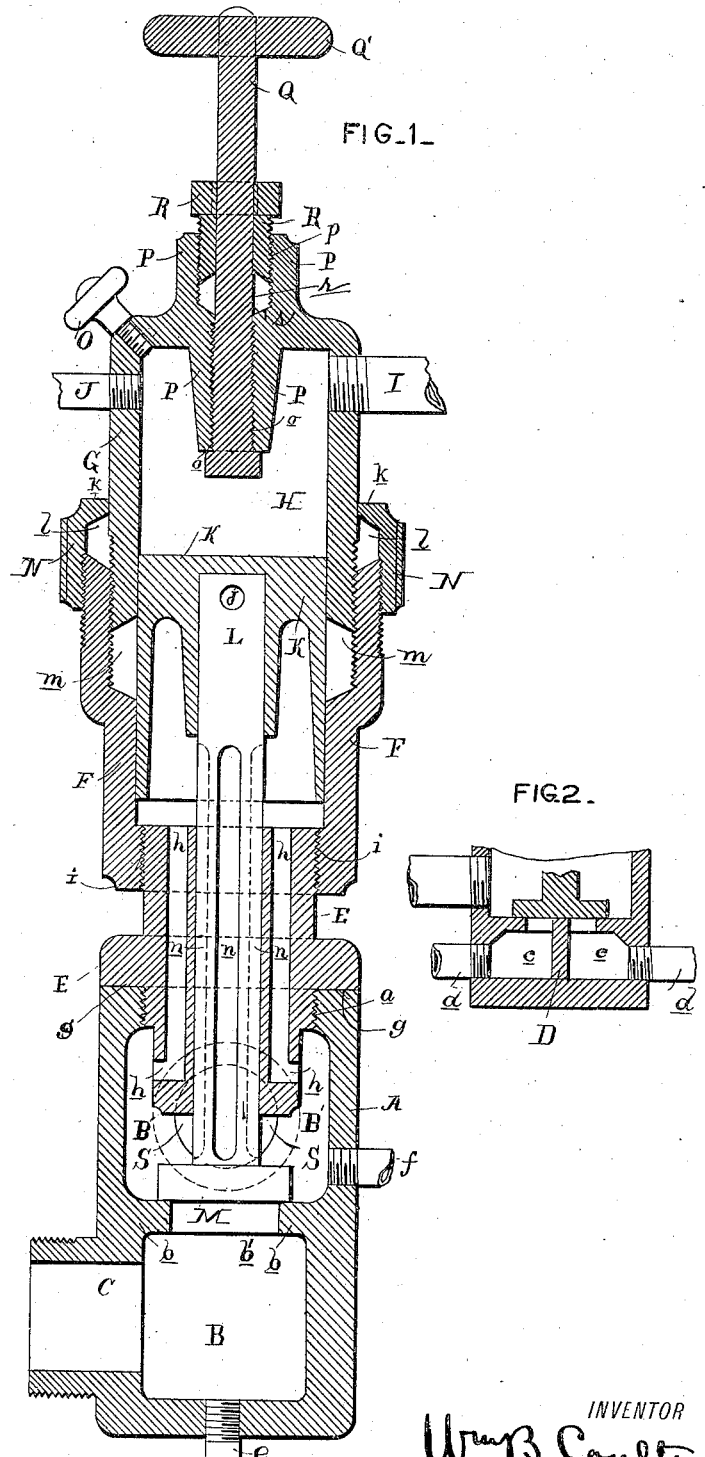
WITNESSES
Wm. T. Gill
Geo. F. Downing
INVENTOR
Wm B. Coulter
By H. A. Simpson
ATTORNEY

UNITED STATES PATENT OFFICE.

WILLIAM B. COULTER, OF BRISTOL, CONNECTICUT.

RELIEF-VALVE.

SPECIFICATION forming part of Letters Patent No. 311,723, dated February 3, 1885.

Application filed April 23, 1884. (No model.)

*To all whom it may concern:*

Be it known that I, W. B. COULTER, of Bristol, in the county of Hartford and State of Connecticut, have invented certain new and useful Improvements in Relief-Valves; and I do hereby declare the following to be a full, clear, and exact description of the invention, such as will enable others skilled in the art to which it appertains to make and use the same.

My invention relates to an improvement in relief-valves for steam fire-engines, stationary engines, &c., the object being to provide a valve which shall be simple and economical in construction, and at the same time efficient in use, and which shall be so constructed that it will need no adjustment for the varying pressures of steam or water; and with these ends in view my invention consists in certain details of construction and combinations of parts, as will be hereinafter described, and pointed out in the claims.

In the drawings, Figure 1 is a view in side elevation of my improvement, and Fig. 2 is a modification.

A represents the lower part of the valve-casing, the ends of the walls being provided with an internal screw-thread, $a$, the said walls being also provided with inwardly-extending shoulders, forming a valve-seat, $b$, and opening $b'$, and chambers B B', into which former leads the pipe C from the chamber containing the pressure to be relieved, and from which latter chamber, B', leads the discharge-pipe S. If desired, this casing may be constructed with two lower chambers, $c\ c$, separated from each other by a partition, D, one of said chambers being connected by a pipe, $d$, to one end of a cylinder, and the other chamber by a similar pipe, $d$, to the other end. The pipes $d$ in this case may enter from the bottom of the chambers, or from the sides, as shown in the drawings. When a single chamber, B, is used, as shown in Fig. 1, an opening, $e$, is formed in the bottom of the casing for the reception of a petcock, and also an opening, $f$, in the upper portion of the casing for a similar cock. To the upper end of this casing A is secured the cylindrical coupling E, provided with a screw-thread adapted to mesh with the thread $a$ on the casing A. Immediately above this thread on the coupling E is formed the shoulder $g$, resting on the upper end of the casing A, to hold them firmly together, and formed with its outer end even or in line with the outer edge of said casing A. The lower end of this coupling extends down within the chamber B, and is provided with ports or openings $h$, extending the whole of its length or a portion of its length, and then turns at right angles to the upper portion and issues from the side, as shown in Fig. 1, said ports forming a dripway for the chamber above the coupling. The upper end of this coupling is screw-threaded, as shown at $i$, onto which is screwed the lower portion of the valve-casing F, the upper portion of which is bent outwardly and provided with a male and female screw-thread. Into the upper end of this casing F is screwed the steam-chamber casing G, inclosing the steam chamber or space H, the inner edge of this casing G resting even or in line with the lower inner edge of the casing F. Into this chamber H leads a pipe, I, from the boiler or pipe conveying the live steam from the boiler to the cylinder, said pipe being provided with a shut-off valve, (not shown,) the chamber H being provided with a petcock, J. The smooth inner edges of the casings F and G form a cylindrical bearing for the piston or valve K, secured by a pin, $j$, to the valve-stem L, provided on its lower end with the valve M, adapted to fit across the valve-opening $b'$, the valve-stem fitted to move easily within the coupling E, and provided with grooves $n$, running a portion or its entire length. These grooves are adapted to lessen the bearing-surface of the stem, and also to receive any grit or foreign substance that might otherwise tend to hold the valve-stem.

To the upper end of the casing F is secured a packing-nut, N, provided with the flange $k$, fitting tightly against the casing G and adapted to prevent any leakage of steam between the casings F and G, a small space, $l$, being left between the flange $k$ and the top of the casing F, forming a stuffing-box which may be filled with any suitable packing. A similar stuffing-box, $m$, is formed between the lower portion of the casing F and the lower end of the casing G, also adapted to receive a suitable packing, which latter is kept from drying up or becoming hard when not in use by means of oil inserted into the chamber H through a hole formed in one corner of the casing G or other convenient point, and adapted to be closed by a nut, O, or other device.

The upper end of the casing G is provided with the neck or cylinder P, extending down into the chamber H, and provided with an internal screw-thread, $o$, and also extending above the top of the casing, which portion is provided with the internal screw-thread, $p$. Into this neck fits the metallic rod Q, the lower portion of which is provided with a screw-thread adapted to mesh with the thread $o$, the upper end of said rod being provided with a disk or wheel, Q', by which it is turned. Around this is adapted to closely fit a packing-nut, R, the lower end of which is screw-threaded and adapted to mesh with the thread $p$ in the upper portion of the neck P. A small space, $r$, is left between the lower end of this nut R and the shoulders $s$, formed in the neck P, forming a stuffing-box.

Having described the construction of my improved valve, I will now set forth its operation.

The pipe C is connected to one end of the cylinder where the pressure is to be relieved, or, if two chambers, $c\ c$, are used, the pipes $d$ to the opposite ends of said cylinder end thereof. The pipe I is connected to the boiler or a pipe conveying the live steam. When the pressure in the chamber B, which, as before stated, is in direct communication with a cylinder of a steam-engine, is sufficient to overcome the steam-pressure in the chamber H, it will raise the valve M and pass into the chamber B' and out through the exhaust or discharge S, leading from said chamber B', after which the pressure in the chamber H, acting on the piston or valve K, will force the stem L down and close the valve-opening $b$. If it is desired to check the action of the valve, the wheel Q is simply turned, screwing the lower end of the rod Q down upon the piston or valve K, and prevents the same from being forced upwardly. By properly arranging the areas of the valves a certain pressure on the piston or valve K will require a certain pressure on the valve M to raise it, and any change in the pressure on the piston or valve K will necessitate a corresponding change in the pressure on the valve M—as, for instance, the pressure in the boiler from which the steam is conveyed might be twenty pounds to the square inch, and is brought to bear upon the piston or valve K. By constructing the valve M of a certain size the twenty pounds of steam-pressure will hold the valve M closed until a pressure of forty pounds is brought to bear upon it. Now, if the pressure in the boiler rises to fifty pounds to the square inch, it will sustain a pressure of one hundred pounds on the valve M. If the pressure decreases in the boiler, the valve M will open with less pressure, the amount of pressure required to open the valve always bearing the same ratio to the pressure in the boiler, thus overcoming the necessity of adjusting the valve to different pressures. By operating the shut-off valve in the pipe I and the petcock J, the steam is caused to circulate through the chamber H, and thus affect the steam-pressure upon the piston or valve K to any extent desired, and thereby allow the valve M to open and close at any predetermined point of pressure.

It will also be seen that from this construction the steam which operates the valve will tend to keep the same warm and prevent it from freezing.

My invention is exceedingly simple in construction, is of few parts, and can be applied at a small initial cost.

I would have it understood that I do not limit myself to the exact construction of parts herein shown and described, but consider myself at liberty to make such changes as fall within the spirit and scope of my invention.

Having fully described my invention, what I claim as new, and desire to secure by Letters Patent, is—

1. The combination, with a sectional valve-casing, the sections being connected by a coupling, and inclosing a valve-stem provided on one end with a valve and on the other end with a piston or valve, of a steam-chamber connected to the upper of said sections, and provided with a pipe connected to the boiler or feed-pipe, the lower section being connected by a pipe or pipes to the chamber containing the pressure to be relieved, substantially as set forth.

2. In a relief-valve, the combination, with two or more sections of a valve-casing inclosing a valve-stem and connected by a coupling, of a steam-chamber connected with the upper of said sections, and by a pipe to the boiler or feed-pipe, the lower section being provided with a pipe or pipes connecting with chamber containing the pressure to be relieved, and means connected with the steam-chamber for checking the action of the piston, substantially as set forth.

3. The combination, with the casing A F, connected by a suitable coupling and inclosing a valve-stem provided on one end with a valve and on the other end with a piston or valve, of a steam-chamber connected with the casing F, and by a pipe to the boiler or main feed-pipe, and a pipe or pipes connecting the casing A with the chamber containing the pressure to be relieved, substantially as set forth.

4. The combination, with the casing A F, of a coupling, E, provided with a dripway, $h$, casing G, and stem L, provided with valves or piston K M, the above parts combined and adapted to operate substantially as set forth.

5. The combination, with a valve-casing inclosing a valve-stem provided on each end with a valve or piston, of a steam-chamber casing connected with said valve-casing, and provided with a pipe connected to the boiler or feed-pipe, a rod secured to the steam-chamber casing, and adapted to be screwed down onto said piston-valve, substantially as set forth.

6. The combination, with valve-casing A F, of the coupling E, casing G, stem L, provided with valve or piston K, valve M, rod Q, provided with wheel Q', and nut R, all of the above parts combined and adapted to operate in the manner and for the purpose substantially as set forth.

In testimony whereof I have signed this specification in the presence of two subscribing witnesses.

WILLIAM B. COULTER.

Witnesses:
M. L. TIFFANY,
WM. H. GRAHAM.